US005528810A

United States Patent [19]

Eddy et al.

[11] Patent Number: 5,528,810

[45] Date of Patent: Jun. 25, 1996

[54] METHOD AND APPARATUS FOR RENOVATING WATER COOLERS

[75] Inventors: John W. Eddy, Riverside; Kelley S. Needham, Yorba Linda, both of Calif.

[73] Assignee: Kel-Jac Engineering and Plastic Sales, Inc., Riverside, Calif.

[21] Appl. No.: 315,333

[22] Filed: Sep. 30, 1994

[51] Int. Cl.$^{6}$ ...................................................... B23P 11/00

[52] U.S. Cl. ................. 29/401.1; 29/402.09; 29/402.14; 29/453; 312/265.6

[58] Field of Search ............................. 29/401.1, 402.11, 29/402.14, 453, 402.09; 312/265.6; 222/146.6; 62/389, 390

[56] References Cited

U.S. PATENT DOCUMENTS

| | | | |
|---|---|---|---|
| 3,915,530 | 10/1975 | Anderson et al. | 312/265.6 |
| 4,320,933 | 3/1982 | Felix et al. | 312/265.6 X |
| 4,779,426 | 10/1988 | Desrosiers | 62/390 |
| 5,297,700 | 3/1994 | Burrows et al. | 222/146.6 |
| 5,423,605 | 6/1995 | Liu | 312/265.6 |

OTHER PUBLICATIONS

Photographs of upper fronts for domestic water coolers by Ebco Company of Ohio.

*Primary Examiner*—S. Thomas Hughes
*Attorney, Agent, or Firm*—Richard L. Gausewitz

[57] ABSTRACT

A method of reducing the expense and labor of renovating different brands of used water coolers. In one of its aspects, the method comprises providing new front panel elements that are substantially identical to each other, and are shaped and adapted to replace corresponding used front panel elements on the used water coolers even though such used front panel elements (and related parts) are different from each other. In another of its aspects, the method comprises providing relatively small panel elements that have faucet holes therein corresponding in size and location to faucet holes in the different brands of used front panel elements, and assembling the appropriate one of such relatively small panel elements with a new front panel element during cooler renovation.

18 Claims, 4 Drawing Sheets

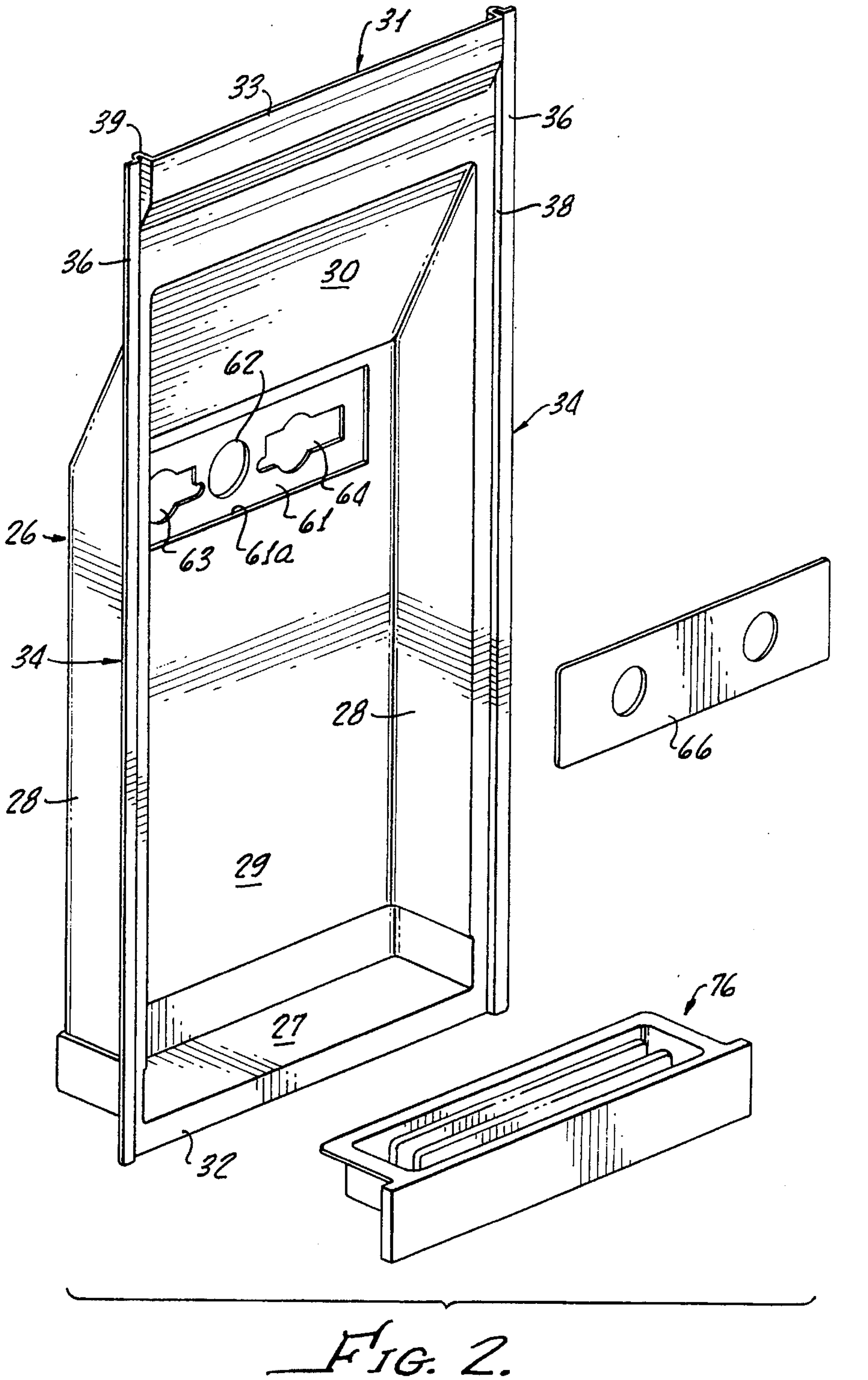
FIG. 2.
FIG. 3.
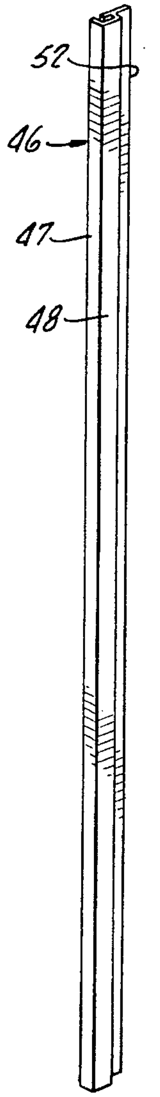

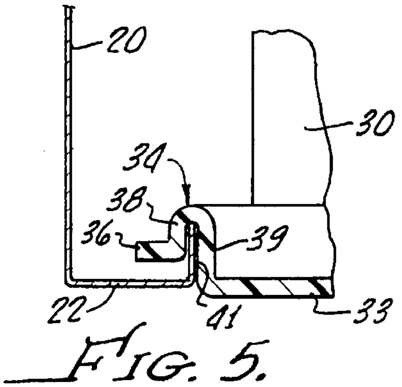
FIG. 5.
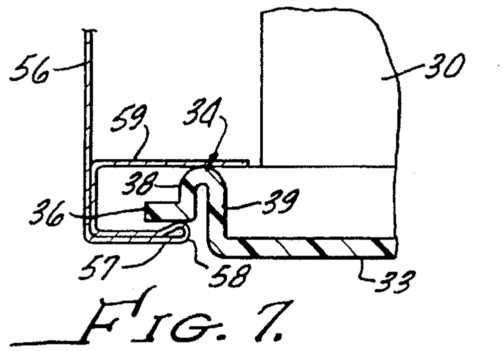
FIG. 7.
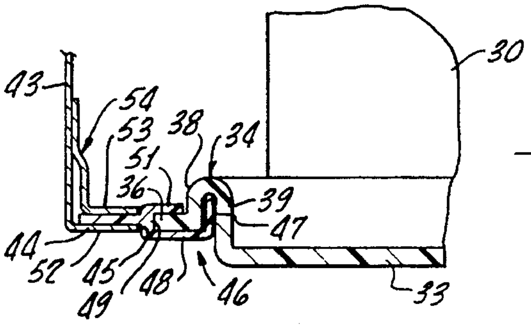
FIG. 6.
FIG. 8.
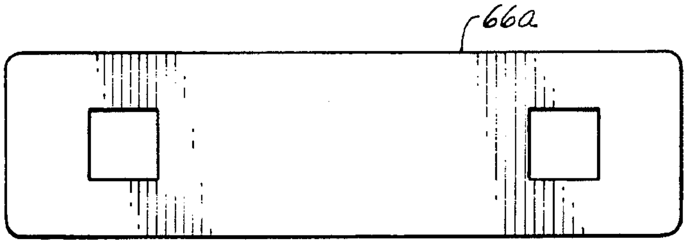
FIG. 9.
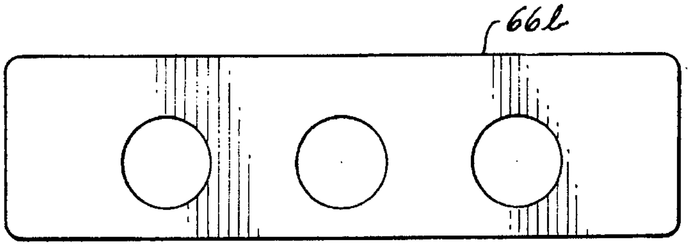
FIG. 10.
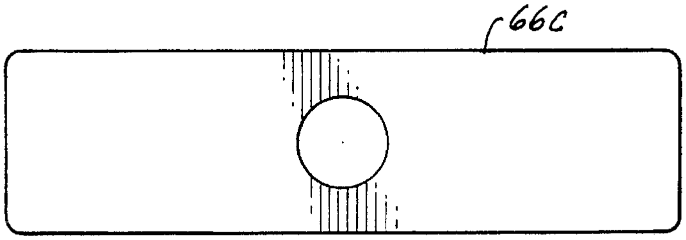

FIG. 11.
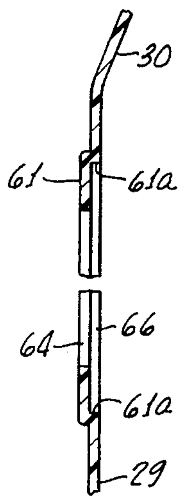
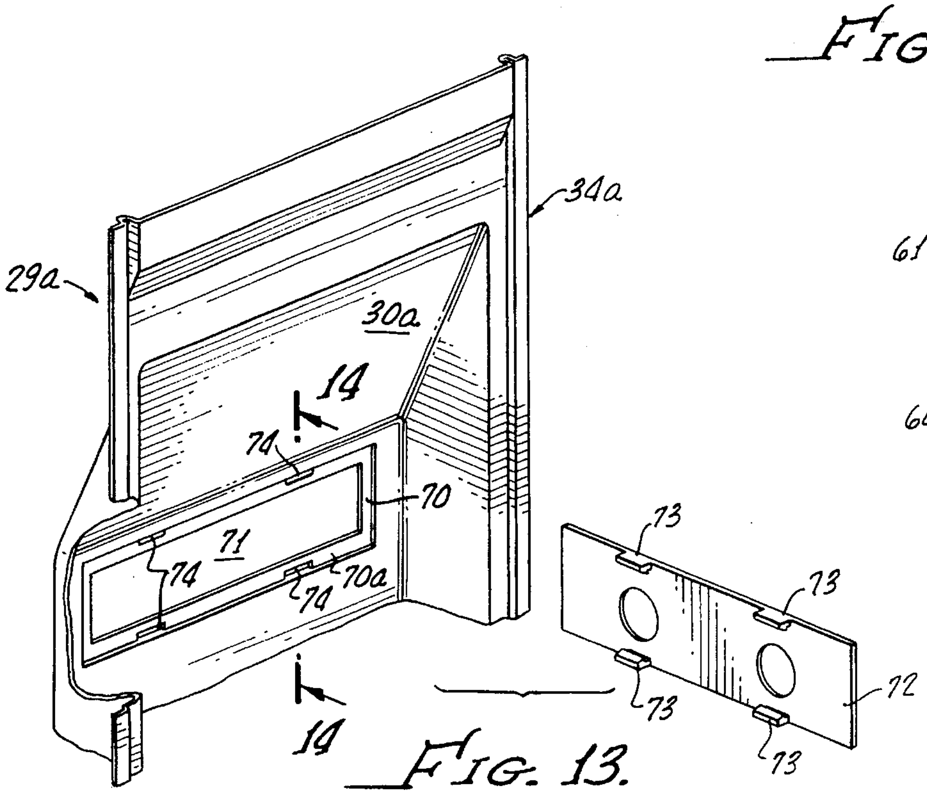
FIG. 13.
FIG. 12.
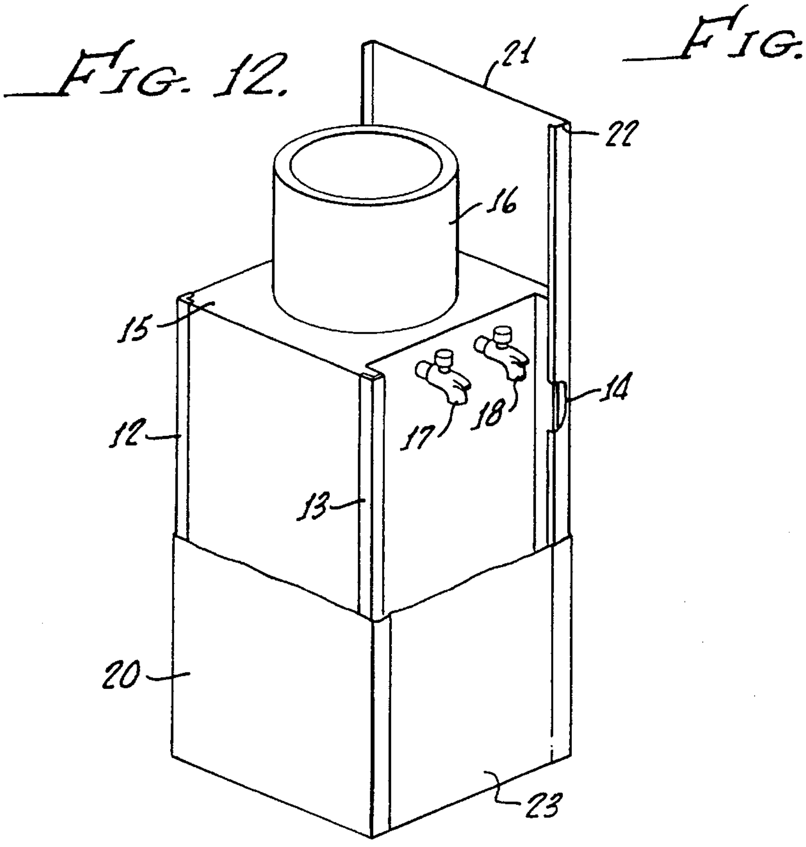
FIG. 14.
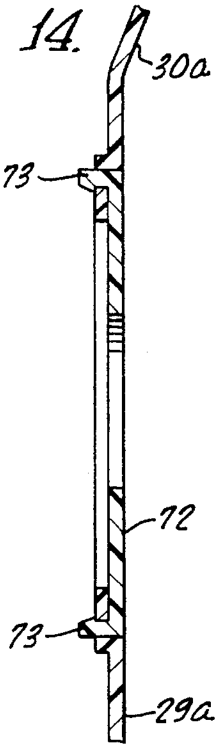

METHOD AND APPARATUS FOR RENOVATING WATER COOLERS

BACKGROUND OF THE INVENTION

Massive numbers of water coolers are used in various parts of the United States, and they sit year after year in homes, offices, factories, etc. During such long periods of use, they gradually deteriorate—especially from a standpoint of aesthetics, namely, "newness" of appearance, "cleanness" of appearance, etc. When the time comes that a customer no longer wants water service (or when a longstanding customer wants a new-looking cooler), the cooler is renovated at a central assembly line.

At such assembly lines, different brands (makes) of coolers are often renovated in a random (mixed) manner. Thus, for example, there may be moving along the assembly line two coolers of Brand A, followed by one of Brand B, followed by three of Brand C, etc. The Brand A, Brand B, and Brand C coolers are differently constructed. The upper fronts thereof are highly important parts of the coolers, from an aesthetic standpoint, in that they are the vertical front panel elements through which the faucets extend, and in which are mounted the drip trays.

The upper fronts are not normally reused; instead they are replaced by newly manufactured upper fronts. This means that large numbers of new upper fronts are often present along the assembly line. The upper fronts are not flat but instead are substantially recessed—typical sizes being about 21 inches by about 11 inches by about 3 inches. They do not nest with each other. The new upper fronts are typically of at least three different constructions, to go with the Brands A, B and C.

Different upper fronts of each brand-and of different brands—may have different faucet-hole arrangements, shapes, sizes, and/or locations. For example, some have one hole, some two and some three. Different cooler manufacturers may locate the holes in somewhat different places.

It is awkward, inconvenient, and relatively inefficient for persons working on the assembly line to reach and move and assemble the different constructions of upper fronts required for the three Brands A, B and C, and for the different holes of each brand. It is a perplexing and often impossible job for persons managing the assembly line to keep correct numbers of the proper upper fronts on hand but with no over-supply.

It would be a major improvement if a single upper front would be capable of convenient assembly with all three Brands A, B and C and all holes. This would not only facilitate assembly but would reduce the cost of manufacturing the new upper fronts. If large numbers of upper fronts could be made from a single set of plastic injection molds, or a single set of sheet metal dies, the mold or die cost would be greatly reduced. Also, there would be reduced need for warehousing of inventory—managing different shapes and types of new upper fronts.

SUMMARY OF THE INVENTION

In accordance with one aspect of the present invention, a single, new upper front is so constructed, and so associated with one molding strip, that it may readily be assembled with all three of the main brands of water coolers, and with conventional faucet-hole numbers and locations.

In accordance with another aspect of the present invention, there are quickly and easily associated with such upper front—at the assembly line—relatively small, nestable mini-panels that are located at the faucet regions of the various coolers. Relatively large numbers of these mini-panels, having different numbers of faucet holes and different faucet hole locations, are provided—as in boxes—at the assembly line. Thus, each box has many mini-panels of the same kind. When a certain cooler is at the assembly-line station where the upper front is mounted, a worker quickly picks up the appropriate and conveniently located mini-panel and assembles it with one of the standard identical new upper fronts. Then, or previously, such standard panel and upper front are assembled with other portions of the used cooler being renovated.

BRIEF DESCRIPTION OF THE DRAWINGS

FIG. 2 is an exploded isometric view of a new upper front, a mini-panel, and a drip tray;

FIG. 3 is a fragmentary isometric view of a molding strip;

FIG. 5 is a horizontal sectional view on line 5—5 of FIG. 1;

FIG. 6 corresponds to FIG. 5 but relates to a second brand of cooler;

FIG. 7 corresponds to FIG. 5 but relates to a third brand of cooler;

FIGS. 8, 9 and 10 are front views of three of the various mini-panels;

FIG. 11 is an enlarged fragmentary sectional view corresponding to a central region of FIG. 4, before mounting of the faucet;

FIG. 12 is a fragmentary isometric view showing the frame, and the side and bottom-front panels, of the cooler;

FIG. 13 is a fragmentary isometric view of a second embodiment of the upper front, with an associated second embodiment of mini-panel; and FIG. 14 is an enlarged fragmentary vertical sectional view on line 14—14 of FIG. 13.

DETAILED DESCRIPTION OF THE PREFERRED EMBODIMENTS

The words "water cooler" and "cooler" denote, in the present specification and claims, various conventional drinking water, etc., apparatus. For example, they comprehend apparatus that dispenses bottled water either at room temperature or refrigerated, and/or R.O. water, and/or hot water for cooking or other purposes.

Figure 1:
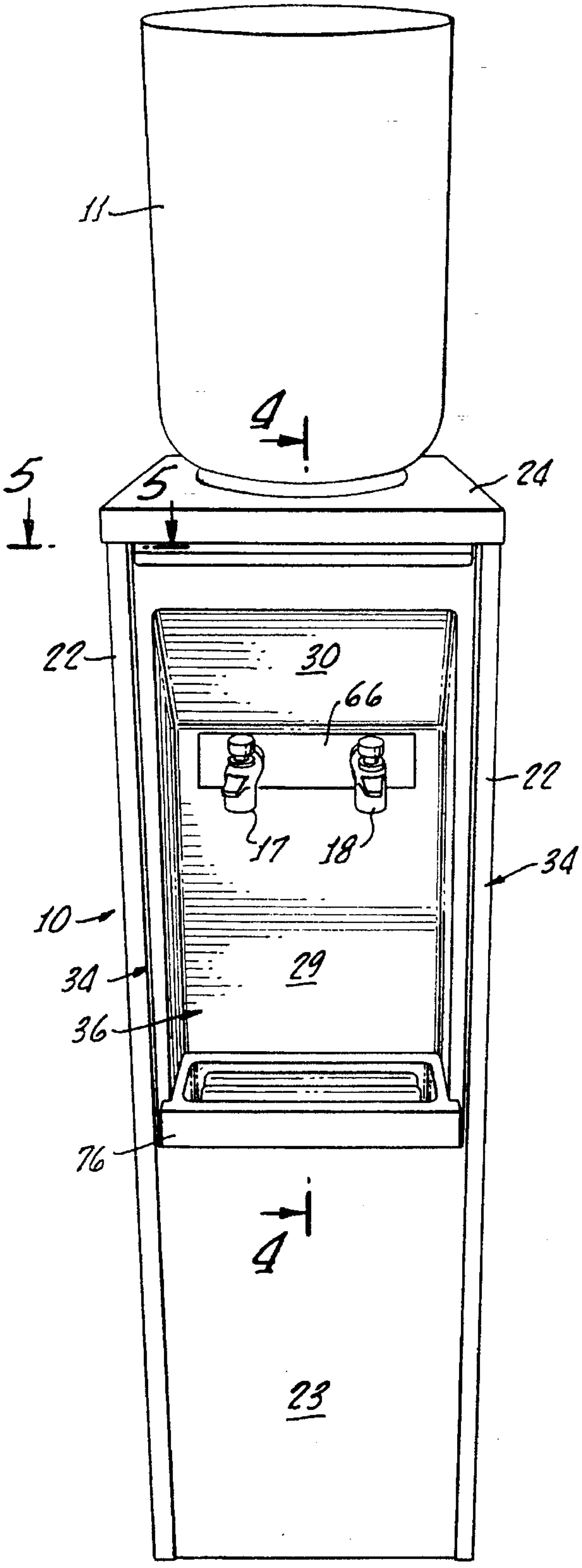
FIG. 1 is an isometric view of a cooler that has been renovated by the present method and apparatus.

Referring to the drawings, and especially FIGS. 1 and 2, a typical water cooler is illustrated as having a body 10 and a water bottle 11 mounted thereon. A rectangular frame formed of vertical angle bars is shown in FIG. 12, three of the angle bars—numbers 12–14—being shown.

The angle bars support a pan or shelf 15 that supports the open-top reservoir 16 in which is received the lower end of the inverted bottle 11. Reservoir 16 communicates with the illustrated two faucets 17, 18. It is to be understood that the interior of the body 10 typically contains refrigeration apparatus and/or R.O. apparatus, and/or water-heating apparatus, etc. The back of the body is frequently open, and across it is often extended the condenser for the refrigeration system.

(The renovated water cooler is shown not only in FIGS. 1 and 12, but also in FIG. 5. Other brands of renovated water coolers are described relative to FIGS. 6 and 7, as set forth below.)

The water cooler brand shown in FIGS. 1, 12 and 5 has side panels 20, 21 that are parallel to each other and mirror images of each other about a vertical central plane. As shown in FIGS. 5 and 12, each side panel has a J-shaped front edge portion, numbered 22.

The body 10 of the cooler further comprises a lower front 23 mounted between angle bars 13, 14. It also comprises a top or cover 24 that is mounted over the upper edges of the side panels, providing support for bottle 11 at the conventional large round opening.

Proceeding next to a description of the upper front that forms a substantial part of the present invention, this is numbered 26 and is best shown in FIGS. 2 and 5. Except as described below, the upper front 26 is injection-molded of synthetic resin, as a single integral piece. It is made of a suitable synthetic resin. Less preferably, it may be sheet metal.

The upper front may be described as recessed or dished, the walls of the recess or cavity fitting between the angle bars 13, 14 (FIG. 12) of the cooler body. The recess or cavity has a horizontal bottom wall 27, vertical side walls 28, a vertical back wall 29, and an upwardly and forwardly inclined top wall 30. The forward edge portions of all of the walls 27–30 are integral with a frame that is given the general number 31 in FIG. 2.

Figure 4:
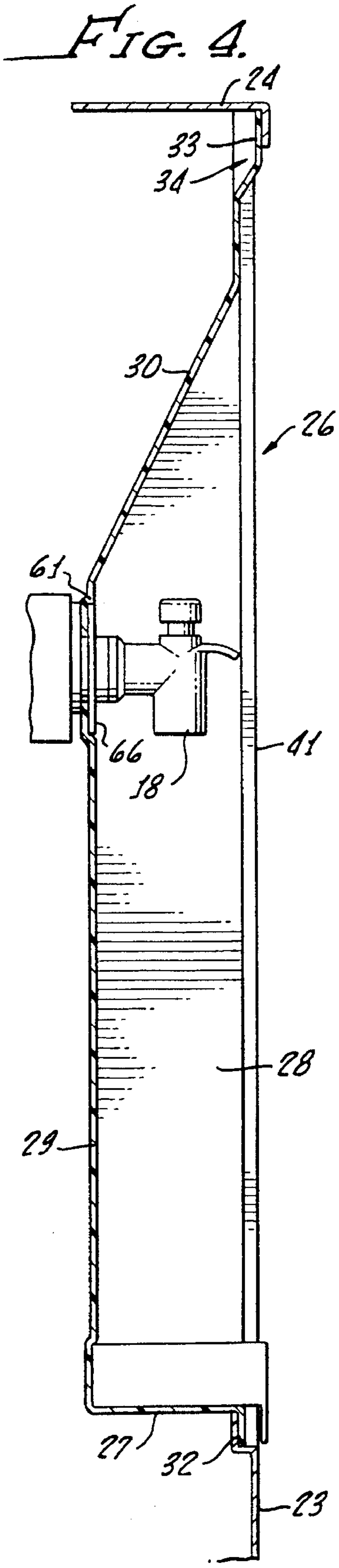
FIG. 4 is a vertical sectional view on line 4—4 of FIG. 1.

Frame 31 has a horizontal bottom portion 32 that is adapted to mate with the upper portion of lower front 23, as shown at the bottom of FIG. 4. It also has a horizontal top portion 33 that fits below top or cover 24, also as shown in FIG. 4. The frame 31 furthermore has two identical (mirror image) sides 34 (vertical side edge portions) as next described in detail.

Referring to FIGS. 2 and 5, frame sides 34 are mirror images of each other about the above-indicated vertical central plane. Each has an outer vertical flange or lip 36 that extends for the full height of the upper front 26, lying in a plane that is parallel to back wall 29, but is spaced far forwardly therefrom (being at the forwardmost region of the upper front). The outer edge of flange or lip 36 is straight and vertical.

Each flange or lip 36 connects at its inner edge to a rearwardly-extending wall 38, this wall being perpendicular to back wall 29 and also extending for the full height of the upper front.

Only at the top portion of the upper front, wall 38 reverse-bends inwardly and then forwardly in hairpin relationship to merge with a forwardly extending short vertical wall 39. Wall 39 has a front-back dimension substantially greater than that of the rearwardly-extending wall 38. At its outer end, short vertical wall 39 merges with the frame top 33.

The J-shaped front edge portion 22 of the side panel 20 of the cooler brand shown (after renovation) in FIGS. 1 5, and 12 has an inwardly-bent flange 41 (FIG. 5) that fits in the narrow groove between walls 38, 39 at the upper portion of the upper front. This provides a connection between side panel 20 and upper front 26 that helps to stabilize each side panel (of the cooler brand of FIGS. 1, 5 and 12) and prevent lateral shifting of the upper front 26.

The flange 41 cooperates with the upper front to present a decorative, close-filling appearance along the full height of the upper front.

It is to be understood that the side panels 20, 21 are suitably associated with the angle bars 12, etc. indicated in FIG. 12. This may be accomplished in various ways, including use of screws.

Water Cooler of FIG. 6

FIG. 6 corresponds to FIG. 5 but relates to a different brand of water cooler. As previously stated, the same new upper front is employed for this different brand, as well as for the third brand described below relative to FIG. 7. Each cooler brand has side panels that are mirror images of each other about the above-indicated vertical central plane, such side panels being suitably associated with frame portions of the different brands of water coolers.

The side panel of the brand of FIG. 6 is numbered 43. It has a front portion 44 at a right angle to the main body of side panel 43, and which terminates at an edge 45 (there being nothing corresponding to flange 41 in FIG. 5).

A flexible synthetic resin extrusion 46 is provided as shown in FIGS. 3 and 6, extending for the full height of the upper front 26. Extrusion 46 has a flange 47 introduced into the small gap between walls 38, 39, and which extends vertically for the full length of the upper front—along wall 38. Extrusion 46 also has an exposed front wall 48 connecting to flange 47 and being parallel to and adjacent outer vertical flange 36 of the upper front. Such element 36 is positioned generally in the same plane as front portion 44 of side panel 43.

Integral with front wall 48 is an inwardly-extending wall 49 perpendicular thereto, such wall 49 passing between edge 45 of panel 43 and the outer edge of outer vertical flange 36. Element 49 is integral with an inwardly-extending flange or lip 51 that fits closely adjacent the inner side of outer vertical flange 36 of the upper front.

The remaining portion of extrusion 46 is a wall 52 that is generally coplanar with flange 51, extending outwardly from the extrusion for a substantial distance. Wall 52 fits between front portion 44 of the panel, and a section 53 of a bracket 54 which is welded or otherwise secured to the interior of panel 43 as illustrated. Stated otherwise, wall 52 of the extrusion is sandwiched quite closely between bracket section 53 and panel portion 44.

In performing the present method relative to the brand of water cooler shown in FIG. 6, the extrusion 46 is first mounted on portions 36, 38 of the upper front, on each side 34 of the frame 31 of the upper front. Such mounting of the extrusion may be accomplished in a few seconds relative to each side, because the flexibility of the extrusion permits mounting to be achieved simultaneously throughout the full length of the upper front, by an extrusion-bending motion. Alternatively, an extrusion may be slid longitudinally of each side of the upper front. Thereafter, the side panels 43 are mounted in the illustrated relationship to the extrusions.

The extrusions being in position, as illustrated in FIG. 6, there is a decorative relationship by which the customer sees portion 48 of the extrusion, as well as front portion 44 of the panel 43, as well as the upper front portions inwardly of the extrusion. Furthermore, and because of the sandwich relation described above relative to wall 52 of the extrusion, the upper front is maintained in place. The maintaining of the upper front in place is also effected by the faucets, as described below relative to the water cooler of FIG. 7.

Water Cooler of FIG. 7

It is emphasized, relative to FIGS. 5–7 inclusive, that the inner edges of the different side panels are spaced at different distances from each other. Thus, for example, the inner edges (flanges 41) in FIG. 5 are quite close together, sufficiently close that the narrow groove between upper front elements 38, 39 receives the flange 41. Relative to FIG. 6, on the other hand, the edges 45 of panel portions 44 are quite far apart, such edges being spaced outwardly from the narrow grooves between upper front elements 38, 39. The described constructions accommodate both of such spacings, as well as differences in the shapes of the two different panels 20, 43.

Relative to FIG. 7, a water cooler portion is illustrated wherein the side panel edge is intermediate in spacing. Thus, the side panel 56 of FIG. 7 has a front edge or wall portion 57 that terminates in an edge 58. The two edges 58 (of the mirror-image side panels 56) are closer to each other than are the edges 45 (FIG. 6) but farther from each other than are the flanges 41 (FIG. 5).

Edge 58 abuts outer vertical flange or lip 36 somewhat outwardly from the groove at the upper end thereof. The edge 58 is not a sharp edge and thus does not need to be protected from possible contact by the users of the water coolers, it being pointed out that the edges of flange 41 (FIG. 5) and edge 45 (FIG. 6) are protected from such contact.

The rounded edge 58 (FIG. 7) results from the fact that the side panel 56 is tightly return-bent, as illustrated, not only the front side thereof but at the adjacent front region of side panel 56. The return-bent portion then bends away from the side panel as a wall 59 that is parallel to front edge or wall 57 and is spaced therefrom.

The construction of the outer frame of the present upper front is so dimensioned as to fit between such wall 59 and front edge or wall 57, as illustrated. Thus, the upper front of the present invention is prevented from moving forwardly or backwardly. It can, however, move sideways for a certain distance, but such movement is prevented by the faucets and associated upper-front and mini-front elements described below. When the faucets are in position, the present upper front 34 is restrained against substantial sideways movement. Furthermore, the faucets cooperate with the regions described in FIGS. 5–7 to prevent front-back movement of the upper front.

The Mini-Panels of the Embodiment of FIGS. 1–12

Referring to FIGS. 2 and 11, the back wall 29 of upper front 26 is rearwardly shallowly indented or recessed to form what, in the presently illustrated embodiment, is a horizontally elongate mini-panel receptacle or mini-panel recess 61. There is a wall 61a surrounding each recess. The recess has three holes or openings therethrough, the central one 62 being shown as round and the outer ones 63, 64 being irregularly shaped. Irregularly shaped openings 63, 64 are so shaped as to receive any of the outer faucets (for example, 17, 18 in FIGS. 1 and 4) of all three brands of water coolers relative to which the presently described components are adapted to be employed.

A substantial number of mini-panels 66, 66a, 66b, etc., are so shaped as to fit into the panel receptacle 61 or panel reception recess. Three of these are illustrated in FIGS. 8–10, it being understood that there are several more having different hole sizes, shapes and/or locations. Thus, for example, FIG. 8 shows two square holes; FIG. 9, three round holes; and FIG. 10, one round hole at the center.

Let it be assumed that in the brand of water cooler described relative to FIGS. 1, etc., the two faucets 17, 18 are so sized and located as to fit mini-panel 66 (FIG. 2), having two holes for the two faucets 17, 18. Because of the shapes of the openings 63, 64 shown in FIG. 2, the faucets 17, 18 of the particular brand of water cooler will fit through the back wall 29 (and its recessed portion 61) of the upper front 26 of FIG. 2. Before the faucets 17, 18 are mounted, however, the appropriate mini-panel 66 is mounted in recess 61 so that the entire bottom wall of the recess 61 is covered, except at the holes in mini-panel 66. The faucets 17, 18 are inserted through the holes in mini-panel 66 and through the openings 63 and are screwed into their conventional fittings or receptacles (FIG. 4) in the water cooler.

Preferably, the mini-panels 66, etc. are secured in their recesses prior to mounting of the faucets. This is done by providing pressure-sensitive adhesive on the rear sides of the mini-panels, so that they instantly remain in the recesses 61 after being inserted therein. The adhesive is pre-applied to the mini-panels, with appropriate release layers of non-stick material.

When the mini-panels 66 etc. are in position, they cannot move because of the edge regions defining recess 61 and, preferably, because of the adhesive. Furthermore, it is pointed out that the faucets are relatively close fits in the openings of the mini-panels, for example, the two openings shown in mini-panel 66 of FIG. 2. Accordingly, when the faucets are in the openings in the mini-panels, which mini-panels cannot move relative to the upper front 26, it follows that the faucets provide anchoring means preventing the mini-panel 26 from moving in any direction. Thus, as indicated above relative to FIG. 7, the edge regions of the illustrated upper front cannot move left or right (FIG. 7), despite the fact that there is no visible constraining means preventing such movement in FIG. 7.

Embodiment of FIGS. 13–14

In the embodiment of FIGS. 13–14, everything is identical as described above relative to the other figures, except that the mini-panels are somewhat different and/or the openings in the back wall of the upper front are different.

The upper front 26a of FIG. 13 has, in its back wall 29a, a recess 70 having a peripheral wall 70a. At a region spaced in from peripheral wall 70a, the bottom of recess 70 is completely cut out to form the large opening 71; such opening will receive all of the faucets of the three brands of water coolers specifically referred to in the present specification.

Numerous mini-panels, such as 72 in FIG. 13, are provided and are shaped to fit snugly in the recess 70. The holes of these various mini-panels, only one of which is shown, correspond to the different hole sizes, numbers and locations indicated in part above.

Each mini-panel 72 has integrally formed thereon a plurality (illustrated as four) of mounting prongs 73 that are adapted to fit snugly in slots 74 provided in the peripheral portion of the bottom wall of recess 70 adjacent wall 70a. The constructions of elements 73, 74 are such that each mini-panel 72 may be quickly mounted in recess 70 by merely inserting prongs 73 through slots 74 and pressing until the prongs pop through the slots and until the body portions of the mini-panels seat on the bottom wall of recess 70. Reference is made to FIG. 14 which shows the panel 72 in inserted condition.

There have thus been shown and described two general types of mini-panels adapted to be associated with the upper fronts and with the different sizes and locations of faucets that are incorporated in the brands of water coolers. It is to be understood that other shapes and sizes of mini-panels could be employed.

It is to be understood that the present upper front 26 may have associated therewith various types of drip trays, one of which is indicated at 76 in FIGS. 1 and 2.

Additional Description of the Method

Thus, relative to both embodiments (FIGS. 1–12 and 13–14), the person (or persons) working on the assembly line removes the side panels and the faucets and the old (used) upper front from the used cooler. They note the number and type and location of faucet holes in the used upper front and select the mini-panel having the same holes.

They quickly associate such mini-panel with the standard new upper front. They note whether the particular brand of cooler is that indicated by FIG. 6. If so, they mount the molding strips 46 on the upper-front side edges.

They assemble the upper front with the used cooler by re-inserting and screwing in the faucets (or new faucets). They mount the original (or new) side panels, as shown in FIG. 5 or 6 or 7, and also associate such side panels with the angle bars.

The foregoing detailed description is to be clearly understood as given by way of illustration and example only, the spirit and scope of this invention being limited solely by the appended claims.

What is claimed is:

1. A method of water cooler renovation, which comprises:

(a) providing a plurality of used water coolers of different constructions, at least one of said coolers having a different relationship between its upper front and its side panels than does at least one other of said coolers, (b) removing the used upper fronts from said at least one cooler and from said at least one other cooler, (c) removing used side panels from said at least one cooler and from said at least one other cooler, (d) providing a plurality of new upper fronts that are identical to each other, each of said new upper fronts having such construction, shape and size that it may be readily assembled with said at least one cooler and said at least one other cooler in place of said removed used upper fronts, (e) assembling one of said new upper fronts with said at least one cooler in place of said removed used upper front thereof, (f) assembling another of said new upper fronts with said at least one other cooler in place of said removed used upper front thereof, and (g) assembling side panels with said new upper fronts and with the bodies of said at least one cooler and said at least one other cooler.

2. The invention as claimed in claim 1, in which said step (g) of assembling side panels with said new upper fronts comprises assembling therewith the respective used side panels that were removed from said coolers in accordance with step (c).

3. The invention as claimed in claim 2, in which said at least one used cooler is so constructed that the side panels thereof bend around front corners thereof and terminate in first edges, and in which said at least one other used cooler is so constructed that the side panels thereof bend around front corners thereof and terminate in second edges, and in which the distance between said first edges is substantially different from the distance between said second edges, whereby said steps (d), (e) and (f) are complicated by said different distances.

4. The invention as claimed in claim 2, in which said at least one used cooler is so constructed that the side panels thereof bend around front corners thereof and terminate in first edges, and in which said at least one other used cooler is so constructed that the side panels thereof bend around front corners thereof and terminate in second edges, and in which said first edges are differently constructed than said second edges.

5. The invention as claimed in claim 4, in which said difference in construction is that said first edges are flanged and said second edges are not.

6. The invention as claimed in claim 4, in which said difference in construction is that said first edges are return-bent and said second edges are not.

7. The invention as claimed in claim 2, in which said at least one used cooler is so constructed that the side panels thereof bend around front corners thereof and terminate in edges, and in which said method further comprises providing moldings on said edges to achieve functional and aesthetic mating with one of said new upper fronts.

8. The invention as claimed in claim 2, in which said method is performed relative to at least three different constructions of used coolers, each of said different constructions being different from each other of said different constructions.

9. The invention as claimed in claim 8, in which the spacings between the front-inner edges of the side panels of said three different constructions are all different from one another.

10. The invention as claimed in claim 8, in which the shapes of the front-inner edges of the side panels of said three different constructions are all different from one another.

11. The invention as claimed in claim 10, in which one of said front-inner edges is unbent and is raw, in which another of said front-inner edges is bent inwardly, and in which another of said front-inner edges is return-bent.

12. The invention as claimed in claim 1, in which said method further comprises locating at least one of said new upper fronts on a cooler by inserting a faucet through a hole in said new upper front.

13. A method of renovating used water coolers, which comprises:

(a) providing a plurality of used water coolers having different numbers or locations of faucet holes in their used upper fronts, (b) providing a plurality of new upper fronts having predetermined shapes and sizes, each of said new upper fronts having wall means in which is formed opening means sufficiently large and so shaped that, when one of said new upper fronts is mounted on any one of said used water coolers, said opening means will selectively receive the faucets that were originally received in said faucet holes in said used upper fronts, (c) providing a plurality of mini-panels, each having faucet hole means corresponding to one of the number and location of one faucet hole means in said used upper fronts, (d) selecting, relative to a particular cooler that has a particular faucet hole number and location, a mini-panel having that number and location, and (e) removing the used upper front from said particular cooler, and (f) assembling said selected mini-panel and one said new upper fronts with said particular cooler.

14. The invention as claimed in claim 13, in which said method further comprises providing in each of said new upper fronts a recess shaped to snugly receive one of said mini-panels, said recess being on the front side of said new upper front.

15. The invention as claimed in claim 14, in which adhesive means are provided to secure said mini-panels in said recesses.

16. The invention as claimed in claim 14, in which prong-and-opening means are provided on said mini-panels and upper fronts to secure said mini-panels in said recesses.

17. A method of renovating used water coolers, which comprises:

(a) inspecting a particular used water cooler to determine the type of upper front it has, and the number, type and location of faucet holes in such upper front thereof, (b) removing said used upper front of said used cooler, (c) providing a standard new upper front having opening means therein for the faucets of various coolers, including said particular cooler, and adapted to mount on various types of coolers, including the type that said particular cooler is, (d) providing a small mini-panel having the same number, type and location of holes as said particular cooler, and (e) mounting said mini-panel and standard upper front on said particular cooler.

18. The invention as claimed in claim 17, in which said method further comprises mounting a faucet on said particular cooler through the hole in said mini-panel, and through said opening means.

* * * * *